United States Patent
Abuomar et al.

(10) Patent No.: US 10,157,214 B1
(45) Date of Patent: Dec. 18, 2018

(54) PROCESS FOR DATA MIGRATION BETWEEN DOCUMENT STORES

(71) Applicant: Amazon Technologies, Inc., Seattle, WA (US)

(72) Inventors: Mohammad Haroon Mohammad Abuomar, Seattle, WA (US); Phanikumar Bhamidipati, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 744 days.

(21) Appl. No.: 14/547,904

(22) Filed: Nov. 19, 2014

(51) Int. Cl.
*G06F 17/30* (2006.01)

(52) U.S. Cl.
CPC .. *G06F 17/30575* (2013.01); *G06F 17/30371* (2013.01)

(58) Field of Classification Search
CPC ......... G06F 17/30194; G06F 17/30575; G06F 3/067
See application file for complete search history.

(56) References Cited

U.S. PATENT DOCUMENTS 8,316,125 B2  11/2012  Dehaan
9,342,574 B2 *  5/2016  Kan ..................... G06F 3/061
2013/0054734 A1  2/2013  Bond et al.
2013/0085989 A1  4/2013  Nayyar et al.
2013/0346365 A1 * 12/2013  Kan ..................... G06F 3/061
                                                                 707/610

FOREIGN PATENT DOCUMENTS

WO    WO 2012/139098 A1    10/2012
WO    WO 2013/110966 A1    8/2013

OTHER PUBLICATIONS

Rimma Nehme, "Automated Partitioning Design in Parallel Database Systems", SIGMOD'11, Jun. 12-16, 20011, ACM, pp. 1137-1148.*
James C. Corbett et al., "Spanner: Google's Globally Distributed Database", Journal ACM Transactions on Computer Systems (TOCS), vol. 31, Issue 3, Aug. 2013, pp. 1-22.*
Carlo Curino, Evan Jones, Yang Zhang, and Sam Madden, "Schism: a Workload-Driven Approach to Database Replication and Partitioning", Proceedings of the LDB Endowment, vol. 3, No. 1, 2010, pp. 48-57.*

* cited by examiner

*Primary Examiner* — Cheryl Lewis
(74) *Attorney, Agent, or Firm* — Davis Wright Tremaine LLP

(57) ABSTRACT

A mechanism for migrating data from a database management system to a remote data store may maintain a row-level mapping of keys to locations, where the location comprises the original location or one of a plurality of destination partitions. Requests to read and write data may be redirected during migration and processed by storing the requested data in one of the destination partitions and updating the row-level mapping. Additional data may be migrated by a background process.

21 Claims, 6 Drawing Sheets

PROCESS FOR DATA MIGRATION BETWEEN DOCUMENT STORES

BACKGROUND

The maintenance of storage subsystems in a database management system may present various challenges. These challenges may include maintenance, capacity planning, and acquisition of requisite amounts of storage. One approach to addressing these challenges may involve utilizing distributed storage systems. However, migrating data from a relational database to a distributed storage system may itself prove challenging, particularly where large amounts of data are involved and downtime for systems that access the data is to be avoided.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be embodied in various systems, methods, computer-readable media, and computer program products usable in conjunction with migrating data from relational database systems, or other database system types, to a distributed data store. A distributed data store may comprise a service architecture and a fleet of computing nodes configured to maintain data partitions. In various cases, significant amounts of data may be migrated between a relational database system and a distributed database store. Some approaches to migrating large amounts of data may require significant periods of downtime. Aspects of the present disclosure may be usable to avoid or reduce downtime during the migration process. These aspects may include preparatory operations, such as defining a data model transformation to apply to the source database schema and validating a destination partition using a write capture and replay mechanism. An online migration mode may cause actively used data to be migrated in response to read or write operations involving the data. A background migration mode may migrate less frequently used data over time. Client processes utilizing the source database may remain active during the migration.

Figure 1:
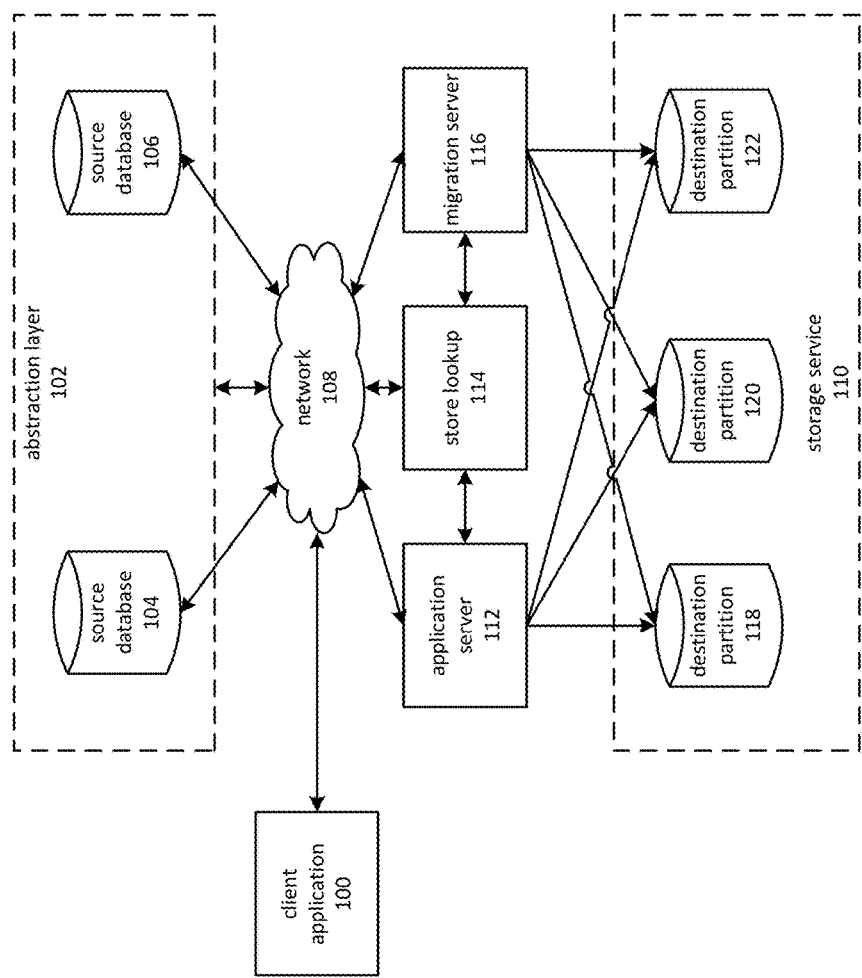
FIG. 1 is a block diagram depicting a process for migrating data from one or more relational databases to a distributed storage system with minimized disruption of access during the migration process.

FIG. 1 is a block diagram depicting a process for migrating data from one or more relational databases to a distributed storage system with minimized disruption of access during the migration process.

A client application 100 may, in some embodiments, interact with an abstraction layer 102 to access data initially located in source databases 104 and 106. Although only a single client application 100 is depicted in FIG. 1, there may be, in various cases, a number of client applications accessing data in source databases 104 and 106 through abstraction layer 102. The abstraction layer 102 may comprise various code modules, applications, application servers, and other similar mechanisms that provide an intermediary layer between, for example, client application 100 and source databases 104 and 106.

A migration server 116 may cause the transfer of data via network 108 to one or more destination partitions 118, 120, and 122. Subsequent to or during the migration process, application server 112 may act as additional intermediaries in satisfying requests to read or write data that may be issued, for example, by client application 100. In some embodiments, application server 112 may be the primary intermediary, which is to say that they may serve the role of abstraction layer 102.

The migration process may involve mapping from a relational schema utilized in source databases 104 and 106 to a key-value organizational schema, which may be used in storage service 110. The key-value organizational schema may also include document-centric and key-multiple value organizational schemas, as well as other organizational schemas including relational schemas.

Data from source databases 104 and 106 may be transferred to one of a plurality of destination partitions 118, 120, and 122. A partition table (not shown) may be maintained to record mapping of data items to a partition. In an embodiment, the partitioning table may map from a logical partition to a physical partition. A logical partition might be arrived at through application of a key value to a hash function, or some other function, to arrive at an identifier of the logical partition. The partition table might then map from the logical partition to a physical partition. In various embodiments, the partitioning table may contain information concerning the status of data migration. The information concerning status of the partition may be maintained on a per-logical partition basis and/or a per-physical partition basis. The information may indicate, for example, a migration process mode relevant to the logical or physical partition. In an embodiment, the information might refer to a store lookup 114 with additional information relevant to the migration, as described herein.

A store lookup 114 may comprise a table, item collection, or other structure. A system, such as the system depicted in FIG. 1, may comprise one or more store lookups 114. For simplicity, FIG. 1 depicts a single store lookup 114.

A store lookup 114 may comprise a mapping between an individual row and a location of the row. In various embodiments, the absence of an explicit mapping may be used to indicate a location of the row corresponding to its original location. The store lookup 114 may allow embodiments to determine if a row has been migrated to storage service 110, for example by indicating to which of destination partitions 118, 120, or 122 the row has been migrated. Alternatively, the store lookup may indicate if the row is in its original location only or has been migrated. Some embodiments may utilize store lookup 114 in conjunction with a partition table to determine which of destination partitions 118, 120, and 122 a row is located, after an initial determination based on a partition table.

A request to read data from the database may be handled by redirecting the request, through the action of abstraction layer 102, from one of source databases 104 or 106 to storage service 110. At storage service 110, embodiments may utilize store lookup 114 to determine if the requested data is located in one of source databases 104 or 106, or if the data has been migrated to one of destination partitions 118, 120, or 122. In various embodiments, these actions may be performed by application server 112.

If the requested data has not been migrated, it may be retrieved from one of source databases 104 and 106, and subsequently migrated in response to the read operation. Accordingly, store lookup 114 may then be updated to indicate that the data has been copied to one of destination partitions 118, 120, or 122.

If the requested data has been migrated, it may be located through store lookup 114. Some embodiments may also utilize a partition table.

Embodiments may process a request to write data by storing the data in one of destination partitions 118, 120, or 122. The request to write data may be redirected from one of source databases 104 or 106 to storage service 110 through the action of abstraction layer 102. The store lookup 114 may be updated to indicate that the data has been migrated, so that subsequent requests to read data may be sourced from one of destination partitions 118, 120, or 122.

An additional process may be performed to migrate data not migrated as a result of the system's processing of a request to read data or a request to write data. These operations may be performed over time, for example as a background task. Note that during this time period, requests to read data or to write data may still be handled as described in the preceding paragraph.

Figure 2:
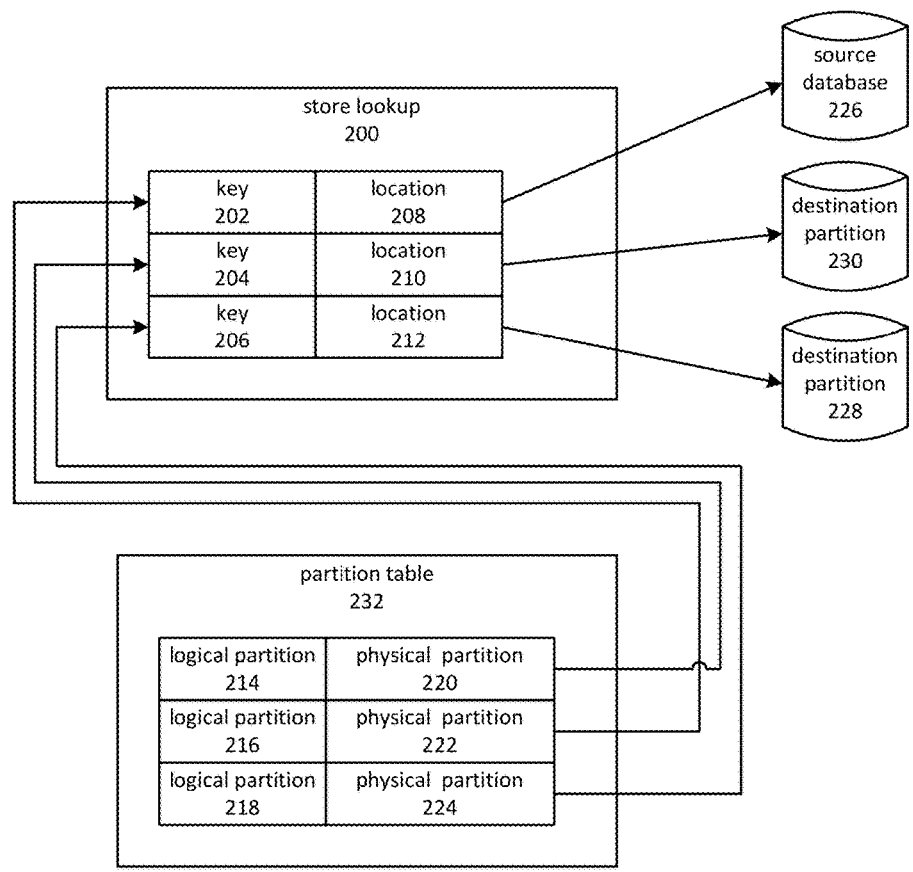
FIG. 2 is a block diagram depicting the use of a store lookup and partition table in conjunction with a migration process.

FIG. 2 is a block diagram depicting the use of a store lookup and partition table in conjunction with a migration process. A store lookup 200 might comprise a table mapping from keys 202, 204, and 206 to locations 208, 210, and 212, respectively. A location may refer to one of being stored at a source of data to be migrated or to being stored at the destination of the migration. In some cases, location may refer to a logical partition or to a physical partition on which the data is stored, if it has been migrated. The location may, in some cases, refer to a source database of the data, if the data has not yet been migrated, or to a partition to which the data has been migrated. In some embodiments, location 208 may be an indicator of whether the data has been migrated to a destination partition or remains in a source database without specifically referring to the location. The destination partition on which the data is located may then be determined through an alternative mechanism.

Store lookup 200 may utilize keys 202, 204, and 206 as a means of accessing a corresponding value. A key may include, for example, a primary or other unique key for the value. In some cases and embodiments, a non-unique key may be utilized, possibly in conjunction with an additional value that, in combination with the key, makes the value unique.

As depicted in FIG. 2, the entry for key 202 corresponds to location 208 and source location 234, which may refer to source database 226. Accordingly, the data item that corresponds to key 202 may not have been migrated at the time depicted in FIG. 2. Keys 204 and 206, on the other hand, may refer to migrated data items stored in destination partitions 230 and 228, respectively.

A partition table 232 may provide a more coarse level of location information. For example, partition table 232 might map from logical partitions 214, 216, and 218 to physical partitions 220, 222, and 224, respectively. In some embodiments, partition table 232 may be used to locate the physical partition of data stored in one of destination partitions 228 and 230 after migration has occurred. In some embodiments, such as the embodiment depicted by FIG. 2, store lookup 200 may contain entries referring to a logical partition, which may then be dereferenced using partition table 232 to identify the physical location of a partition.

Some embodiments may reverse the order in which store lookup 200 and partition table 232 are accessed. For example, store lookup 200 might be consulted to determine whether a piece of data has been migrated, and partition table 232 utilized to determine the physical location of the data. An additional column might be included in store lookup 200 so that embodiments may map from a key value to either a source database at the source location or a logical partition at the destination location. Embodiments may, in some cases, consult partition table 232 for data that has already been migrated, and use some other mechanism to determine the location of a source database, if such a determination is needed.

Figure 3:
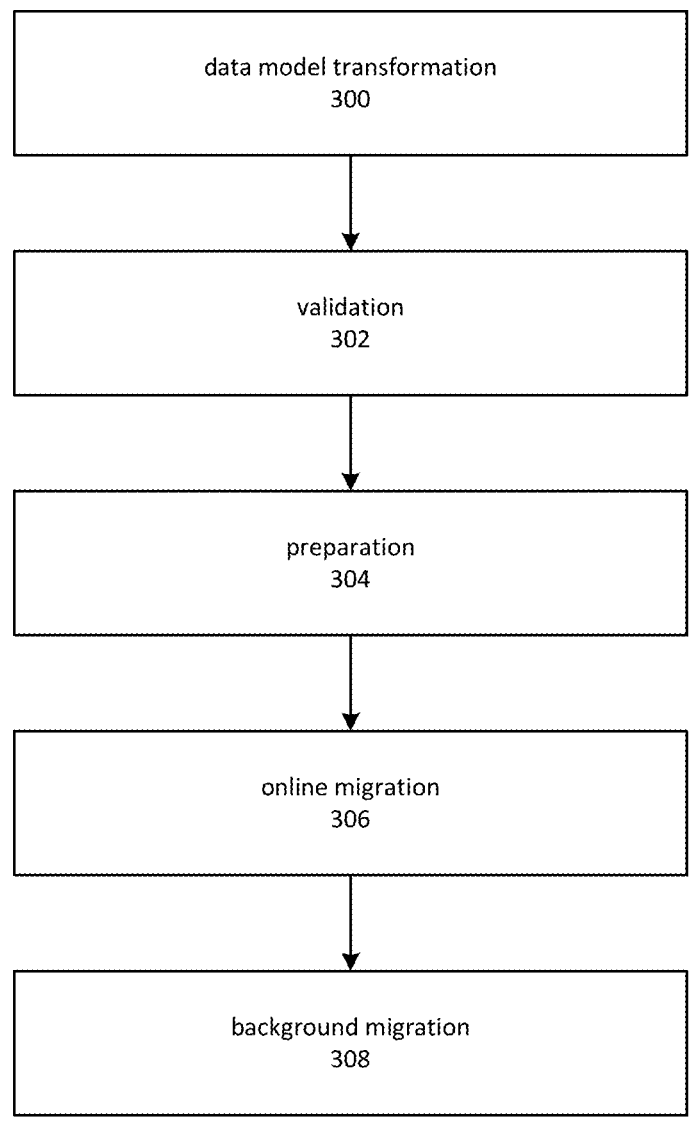
FIG. 3 is a flowchart depicting an embodiment of a process for migrating data from one or more relational databases to a distributed storage system with minimized disruption of access during the migration process.

FIG. 3 is a flowchart depicting an embodiment of a process for migrating data from one or more relational databases to a distributed storage system with minimized disruption of access during the migration process. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 300 refers to an embodiment creating or identifying a data model transformation. This may comprise mapping from a relational schema to a key-value schema. Additional transformations of the data may be created or identified, such as formatting the data so that it may be stored in and retrieved from a distributed storage system. This may, for example, comprise segmenting the data so that the maximum segment size is under a threshold supported by the distributed storage subsystem.

Element 302 refers to a validation mode that may comprise capturing write requests made on the destination side of the migration, prior to commencing migration of the data. The captured write requests may be replayed on the destination side, i.e. applied to the distributed storage system, while measuring various performance metrics, such as central processing unit ("CPU") utilization, storage consumption rate, and so on. These metrics may be utilized in evaluating computational and storage demands that may be placed on the distributed storage system subsequent to migration.

Element 304 refers to a preparation mode. The preparation mode may involve creating a store lookup table and ensuring that each of the destination partitions is configured to utilize the store lookup table. It may further comprise initial stages of configuring an abstraction layer to be able to redirect requests to read data or to write data from a source database to an appropriate destination partition.

Element 306 refers to an online migration mode, in which requests to read data or to write data are redirected to the distributed data service. During this stage, requests to read a data item may be processed by retrieving the data from the source side when migration of the data item has not yet occurred, or from the destination side once the data item has been migrated. When a request to read data is processed by retrieving the data from the source side, it may then be stored at the destination side. The store lookup table may then be updated to refer to the migrated location.

Element 308 refers to a background migration mode. In this mode, data which has not been affected by a request to read a data item or to write a data item may be migrated. The migration may occur on a period or intermittent basis. As migration occurs, the store lookup table may be updated. Requests to read or write data items may continue to be processed as described herein.

As migration occurs, certain destination partitions may begin to lead others, such that a significant portion of the data destined for the particular partition may have been migrated. In some cases and embodiments, a store lookup or partition table may be updated to indicate the leading state. Embodiments may then perform subsequent read or write operations by involving only the destination partition. In some cases, the use of the store lookup table may be bypassed.

The online migration and background migration modes referred to in elements 306 and 308 may, in some cases and embodiments, occur in parallel. Data accessed through read and write operations may be migrated by operations similar to those described in the online migration mode depicted by element 306, while inactive data may be migrated according to the background migration mode depicted by element 308.

Figure 4:
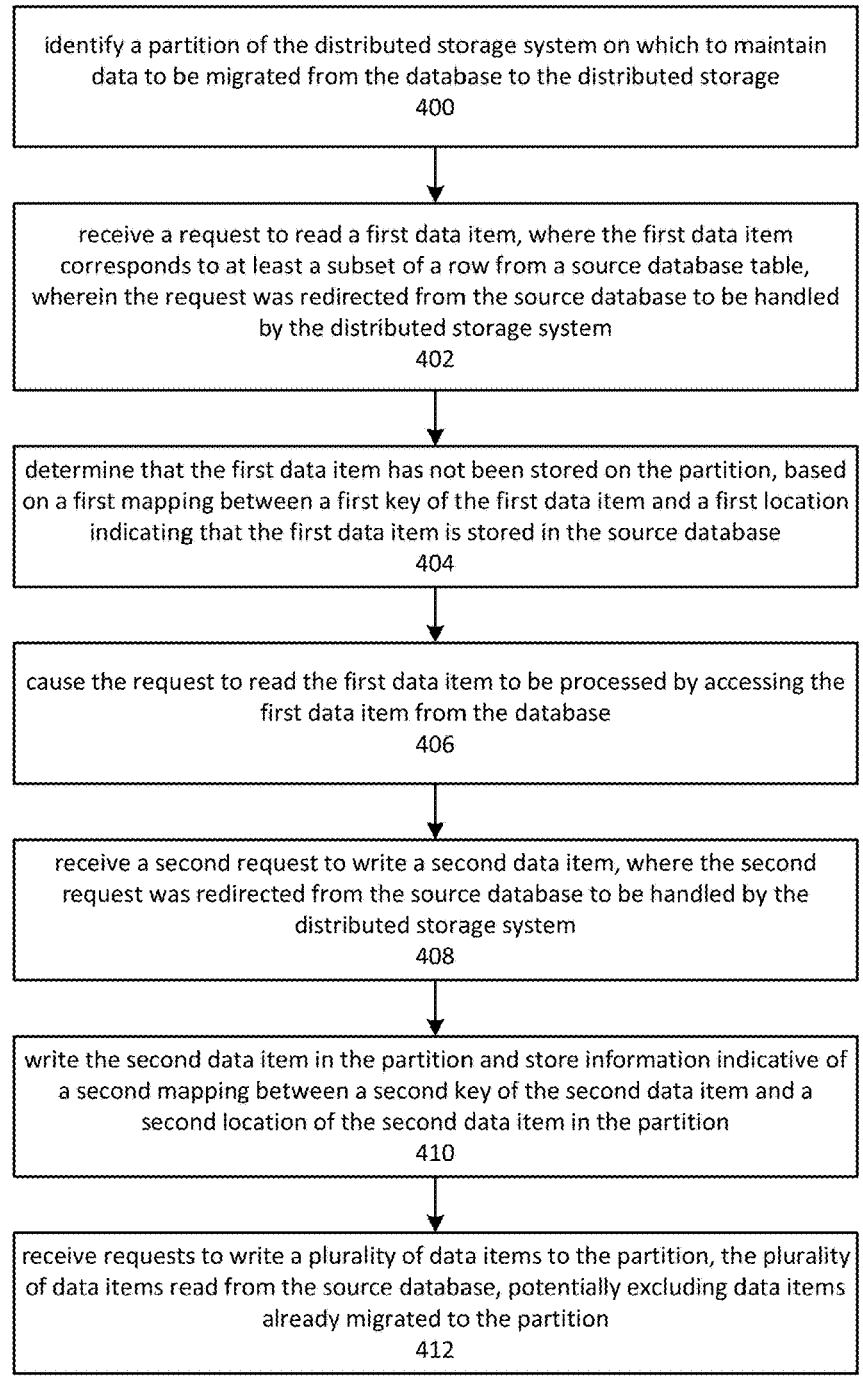
FIG. 4 is a flowchart depicting an embodiment of a process for migrating data from one or more relational databases to a distributed storage system with minimized disruption of access during the migration process.

FIG. 4 is a flowchart depicting an embodiment of a process for migrating data from one or more relational databases to a distributed storage system with minimized disruption of access during the migration process. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using various combinations of computer-executable instructions executed by a computing system, such as the computing systems described herein.

Element 400 depicts an embodiment identifying a partition, of a plurality of partitions of the distributed storage, for maintaining data to be migrated from the database to the distributed storage. Embodiments may support multiple partitions, utilizing various partitioning schemes to assign data to an appropriate partition. For example, a key value might be supplied to a hash function in order to determine a logical partition, and a mapping as indicated by a partition table used to determine a physical partition.

Element 402 depicts an embodiment receiving a first request to read a first data item, the first data item corresponding to at least a subset of a row of a table of the database, wherein the request was redirected from the database to the one or more computing nodes. Requests to read data items may be intercepted at an abstraction layer and redirected to a distributed storage system, to a front end for a distributed storage system, or to some other service that interacts with a distributed storage system.

Element 404 depicts an embodiment determining that the first data item has not been stored on the partition, based at least in part on a first mapping between a first key of the first data item and a first location, the first location indicative of the first data item being stored in the source database. The first data item may, in this case, not have been migrated yet. Embodiments may cause the first data item to be retrieved from the source database and supplied to the requesting client application. Element 406 depicts an embodiment causing the request to read the first data item to be processed based at least in part on accessing the first data item in the database. In addition, embodiments may cause the first data item to be migrated in response to the read operation, so that subsequent read operations may be sourced from the destination partition. A mapping corresponding to the first data item may be updated to reflect the migrated location of the first data item.

Element 408 depicts an embodiment receiving a second request to write a second data item, wherein the second request was redirected from the source database to the distributed storage system. Element 410 depicts an embodiment writing the second data item in the partition and storing information indicative of a second mapping between a second key of the second data item and a second location, the second location indicative of the second data item being stored in the partition. As described herein, embodiments may process write operations by storing the new value of the item in the destination partition, and updating the second mapping to indicate the location of the updated second data item.

Element 412 depicts receiving requests to write a plurality of data items to the partition, the plurality of data items read from the source database, the second data item being potentially excluded from the plurality of data items based at least in part on the second mapping indicating that the second data item is located in the partition. A background task or some other process may cause additional records, such as those not migrated through the read or write operations described above, to be migrated.

Aspects of the present disclosure may be included in a data migration service. A data migration service may include facilities for receiving metadata that describes a source database, providing a mechanism for transformation of data in the source database to a key-value schema, a mechanism for integrating application servers, and a mechanism for moving data to the destination partitions.

A client of the data migration service may provide metadata that describes the source database and that may include other information used during data migration. The metadata may include table definitions, column definitions, indications of which columns are key values, and so on. The information may also include connection information for the source databases. The connection information may be associated with a database account, domain account, or other credentials for accessing the source database with sufficient privileges to perform the migration. In some cases and embodiments, read access to the tables may be sufficient. Additional information may also be provided concerning the destination partitions, such as credentials that may be used to access the destination partitions. In some cases and embodiments, the destination partitions may be managed by the provider of the data migration service. In other cases and embodiments, the destination partitions may be managed by a third party. Credentials for accessing the third-party partitions, generally including write permissions, may be included in the metadata.

The data migration service may provide a mechanism for transforming data in the source database to a key-value schema. The mechanism may comprise function interfaces for communicating between the data migration process and a conversion module. For example, a user of the migration service might implement a code module containing a function that transforms data in a table to a key-value schema. The function might be called via a callback mechanism in which the data migration process may invoke the callback when a row of data requires conversion from its source format to a key-value schema.

A mechanism for integrating application servers into the data migration process may be provided. The mechanism for integrating application servers may include an injection procedure whereby requests to access data in the source database are directed to a code module that may determine and take actions related to the migration.

The data migration service may also include a mechanism for moving data to the destination partitions. This may include various aspects, as described herein, for performing online migration and background migration. Requests to write data may be redirected to a destination partition. Requests to read data may be directed to either a destination partition or a source database, depending upon the data's migration status. The read data may be stored in the destination period in response to the read request. The background migration process may cause data not migrated through read or write requests to be migrated over time. The mechanism for moving data to the destination partitions may also include a store lookup and a partition table.

In an embodiment, a computer-implemented method for migrating data from a database to a distributed storage system may comprise identifying a partition, of a plurality of partitions of the distributed storage system, for maintaining data to be migrated from the database to the distributed storage system. The method may further comprise determining, in response to a request to read a first data item, that the first data item has not been stored on the partition, based at least in part on a first mapping between a first key of the first data item and a first location, the first location indicative of the first data item being stored in the database. The method may further comprise causing the request to read the first data item to be processed based at least in part on accessing the first data item in the database, and writing, in response to a second request to write a second data item, the second data item in the partition. The method may further comprise storing information indicative of a second mapping between a second key of the second data item and a second location, the second location indicative of the second data item being stored in the partition. The method may further comprising writing a plurality of data items to the partition, the plurality of data items read from the database, where the second data item may be excluded from the plurality of data items based at least in part on the second mapping indicating that the second data item is located in the partition.

The described method may be further extended by various additional aspects, which may be combined in various ways. Each of the following aspects may be combined with other aspects. Furthermore, such combinations neither preclude the addition of other aspects, nor require certain aspects to be included or omitted.

In one aspect, the method may further comprise maintaining a record indicative of a relationship between a logical partition and the partition, the record comprising information indicative of a migration state of data in the logical partition.

In another aspect, the method may further comprise receiving information indicative of a plurality of write operations directed to the database, replaying the plurality of write operations on the partition, monitoring performance of the partition during replay of the plurality of write operations, and deleting data written during replay of the plurality of write operations.

In another aspect, the method may further comprise identifying a transformation of relational data of the database to a data item, the transformation selected based at least in part on data size being compatible with the distributed storage.

In another aspect, the method may further comprise deleting the first mapping and the second mapping in response to a determination that at least the plurality of data items has been stored on the partition.

In another aspect, the first mapping and the second mapping are maintained in a temporary storage local to a client application.

In another aspect, the method may further comprise determining, in response to an additional request to read the first data item, to retrieve the data item from the partition without accessing the first mapping, the determining based at least in part on a migration status of data in the partition.

In another aspect, the method may further comprise writing the first data item to the partition in response to the request to read the first data item.

In another aspect, the method may further comprise receiving, at a migration service, metadata that includes information indicative of credentials for connecting to the database. The method may further comprise causing a first data in the database to be transformed to the first data item, and causing the request to read the first data item to be redirected to the migration service.

In a further embodiment a computer-readable medium or computer program product may have stored thereon instructions that, upon execution by a computing device, cause the computing device at least to identify a partition, of a plurality of partitions of a distributed storage system, for maintaining data to be migrated from a database to the distributed storage system. The instructions may further cause the computing device to determine, in response to a request to read a first data item, that the first data item has not been stored on the partition, based at least in part on a first mapping between a first key of the first data item and a first location, the first location indicative of the first data item being stored in the database. The instructions may further cause the computing device to cause the request to read the first data item to be processed based at least in part on accessing the first data item, the first data item corresponding to at least a subset of a row of a table of the database. The instructions may further cause the computing device to write, in response to a second request to write a second data item, the second data item in the partition and storing information indicative of a second mapping between a second key of the second data item and a second location, the second location indicative of the second data item being stored in the partition. The instructions may further cause the computing device to write a plurality of data items to the partition, the plurality of data items read from the database, the second data item excluded from the plurality of data items based at least in part on the second mapping indicating that the second data item is located in the partition.

In another embodiment, a system may comprise one or more memories bearing the instructions just described. The system may further comprise one or more computing nodes. The operations described may be performed upon execution of the instructions by at least one of the one or more computing nodes.

The described instructions may be further extended by various additional instructions related to additional aspects, which may be combined in various ways to form additional embodiments. Each of the following aspects may be combined with other aspects. Furthermore, such combinations neither preclude the addition of other aspects, nor require certain aspects to be included or omitted.

In an aspect, the instructions may cause a computing device or system to maintain a record indicative of a relationship between a logical partition and the partition, the record comprising information indicative of a migration state of data in the logical partition.

In an aspect, the instructions may cause a computing device or system to receive information indicative of a plurality of write operations directed to the database, and replay the plurality of write operations on the partition.

In another aspect, the instructions may cause a computing device or system to identify a transformation of relational data of the database to a data item, the transformation selected based at least in part on data size being compatible with the distributed storage system.

In another aspect, the instructions may cause a computing device or system to delete the first mapping and the second mapping in response to a determination that at least the plurality of data items has been stored on the partition.

In another aspect, the instructions may cause a computing device or system to retrieve the data item from the partition without accessing the first mapping.

In another aspect, the instructions may cause a computing device or system to write the first data item to the partition in response to the request to read the first data item.

Figure 5:
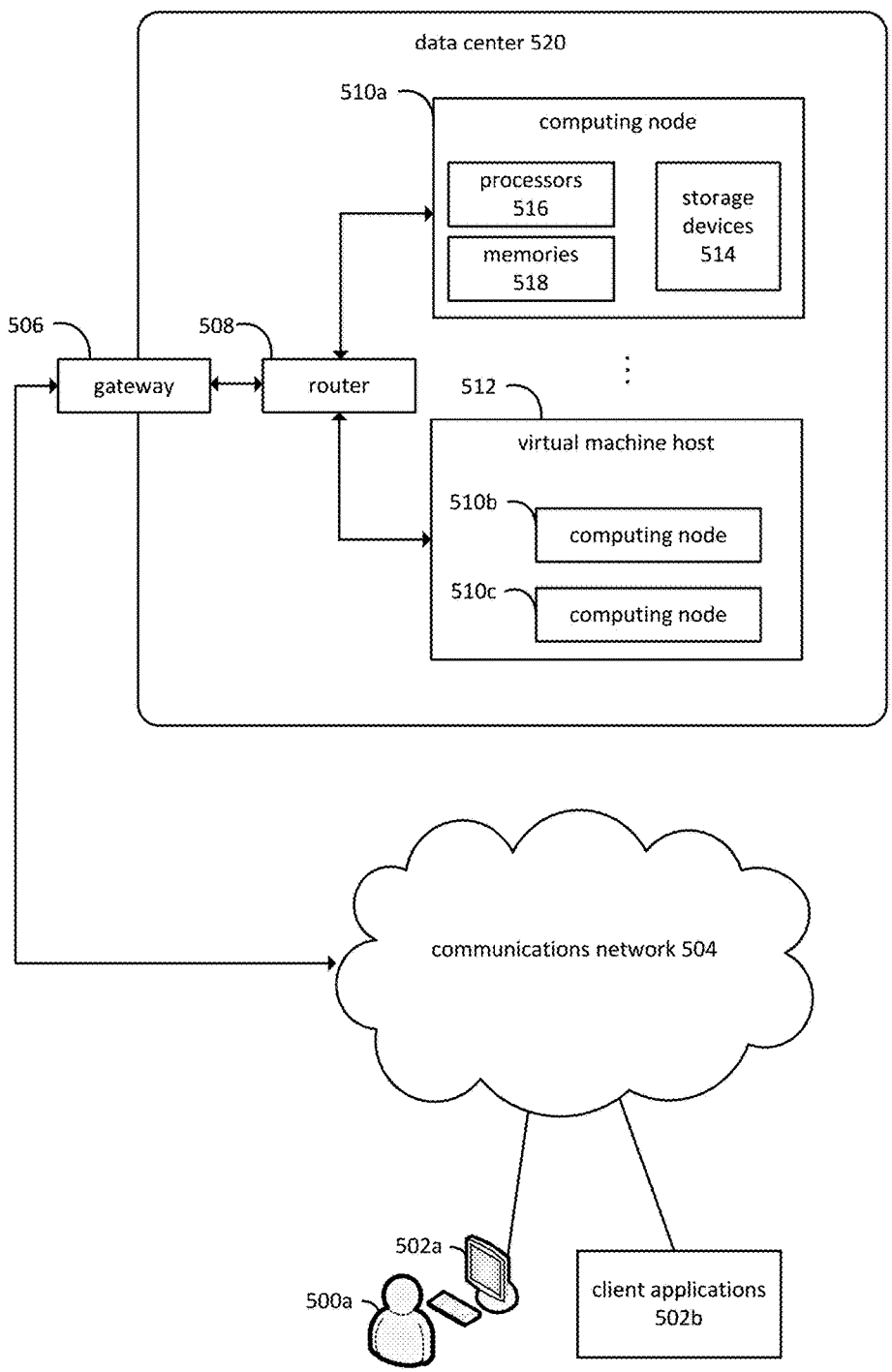
FIG. 5 is a block diagram depicting an embodiment of a computing environment in which aspects of the present disclosure may be practiced.

FIG. 5 is a diagram depicting an example of a distributed computing environment on which aspects of the present invention may be practiced. Various users 500a may interact with various client applications, operating on any type of computing device 502a, to communicate over communications network 504 with processes executing on various computing nodes 510a, 510b, and 510c within a data center 520. Alternatively, client applications 502b may communicate without user intervention. Communications network 504 may comprise any combination of communications technology, including the Internet, wired and wireless local area networks, fiber optic networks, satellite communications, and so forth. Any number of networking protocols may be employed.

Communication with processes executing on the computing nodes 510a, 510b, and 510c, operating within data center 520, may be provided via gateway 506 and router 508. Numerous other network configurations may also be employed. Although not explicitly depicted in FIG. 5, various authentication mechanisms, web service layers, business objects, or other intermediate layers may be provided to mediate communication with the processes executing on computing nodes 510a, 510b, and 510c. Some of these intermediate layers may themselves comprise processes executing on one or more of the computing nodes. Computing nodes 510a, 510b, and 510c, and processes executing thereon, may also communicate with each other via router 508. Alternatively, separate communication paths may be employed. In some embodiments, data center 520 may be configured to communicate with additional data centers, such that the computing nodes and processes executing thereon may communicate with computing nodes and processes operating within other data centers.

Computing node 510a is depicted as residing on physical hardware comprising one or more processors 516, one or more memories 518, and one or more storage devices 514. Processes on computing node 510a may execute in conjunction with an operating system or alternatively may execute as a bare-metal process that directly interacts with physical resources, such as processors 516, memories 518, or storage devices 514.

Computing nodes 510b and 510c are depicted as operating on virtual machine host 512, which may provide shared access to various physical resources, such as physical processors, memory, and storage devices. Any number of virtualization mechanisms might be employed to host the computing nodes.

The various computing nodes depicted in FIG. 5 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 6:
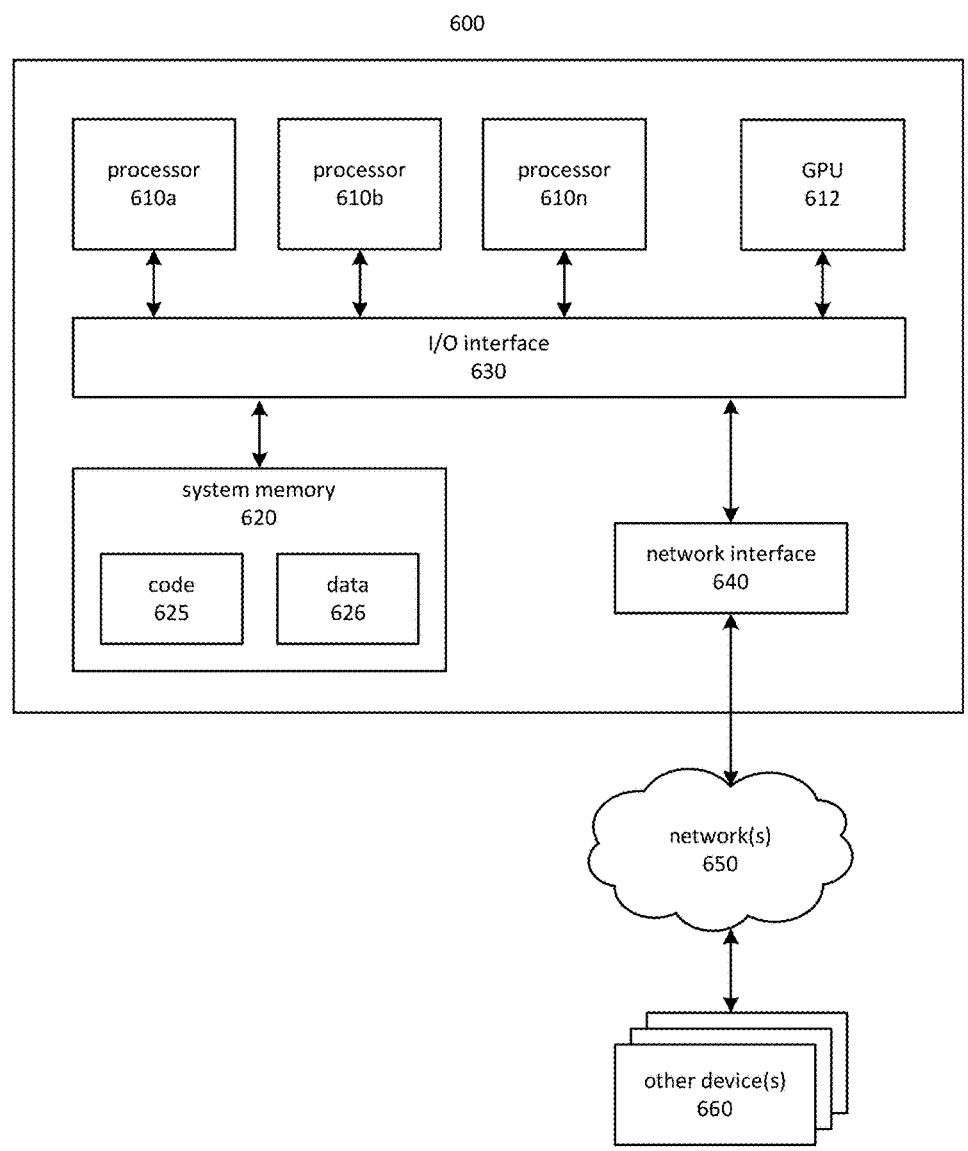
FIG. 6 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 6 depicts a general-purpose computer system that includes or is configured to access one or more computer-accessible media. In the illustrated embodiment, computing device 600 includes one or more processors 610a, 610b, and/or 610n (which may be referred herein singularly as a processor 610 or in the plural as the processors 610) coupled to a system memory 620 via an input/output ("I/O") interface 630. Computing device 600 further includes a network interface 640 coupled to I/O interface 630.

In various embodiments, computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures ("ISAs"), such as the x86, PowerPC, SPARC or MIPS ISAs, or any other suitable ISA. In multiprocessor systems, each of processors 610 may commonly, but not necessarily, implement the same ISA.

In some embodiments, a graphics processing unit ("GPU") 612 may participate in providing graphics rendering and/or physics processing capabilities. A GPU may, for example, comprise a highly parallelized processor architecture specialized for graphical computations. In some embodiments, processors 610 and GPU 612 may be implemented as one or more of the same type of device.

System memory 620 may be configured to store instructions and data accessible by processor(s) 610. In various embodiments, system memory 620 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 620 as code 625 and data 626.

In one embodiment, I/O interface 630 may be configured to coordinate I/O traffic between processor 610, system memory 620, and any peripherals in the device, including network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect ("PCI") bus standard or the Universal Serial Bus ("USB") standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computing device 600 and other device or devices 660 attached to a network or networks 650, such as other computer systems or devices, for example. In various embodiments, network interface 640 may support communication via any suitable wired or wireless general data networks, such as types of Ethernet networks, for example. Additionally, network interface 640 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 620 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 600 via I/O interface 630. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 600 as system memory 620 or another type of memory. Further, a computer-accessible medium may include transmission media or signals, such as electrical, electromagnetic or digital signals, conveyed via a communication medium, such as a network and/or a wireless link, such as those that may be implemented via network interface 640. Portions or all of multiple computing devices, such as those illustrated in FIG. 6, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth.

Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for migrating data from a database to a distributed storage, wherein access to the data during migration is improved, the system comprising:
   one or more computing nodes; and
   one or more memories having stored thereon computer-readable instructions that, upon execution by the one or more computing nodes, cause the system at least to:
      identify a partition, of a plurality of partitions of the distributed storage, for maintaining data to be migrated from the database to the distributed storage;
      receive a first request to read a first data item, the first data item corresponding to at least a subset of a row of a table of the database, wherein the first request was redirected from the database to the one or more computing nodes;
      determine that the first data item has not been stored on the partition, based at least in part on a first mapping between a first key of the first data item and a first location, the first location indicative of the first data item being stored in the database;
      cause the request to read the first data item to be processed based at least in part on accessing the first data item in the database;
      receive a second request to write a second data item, wherein the second request was redirected from the database to the one or more computing nodes;
      write the second data item in the partition and store information indicative of a second mapping between a second key of the second data item and a second location, the second location indicative of the second data item being stored in the partition; and
      receive requests to write a plurality of data items to the partition, the plurality of data items read from the database, the second data item excluded from the plurality of data items based at least in part on the second mapping indicating that the second data item is located in the partition.

2. The system of claim 1, further comprising one or more memories having stored thereon computer-readable instructions that, upon execution by the one or more computing devices, cause the system at least to:
   maintain a record indicative of a relationship between a logical partition and the partition, the record comprising information indicative of a migration state of data in the logical partition.

3. The system of claim 1, further comprising one or more memories having stored thereon computer-readable instructions that, upon execution by the one or more computing devices, cause the system at least to:
   receive information indicative of a plurality of write operations directed to the database;
   replay the plurality of write operations on the partition; and
   monitor performance of the partition during replay of the plurality of write operations.

4. The system of claim 1, further comprising one or more memories having stored thereon computer-readable instructions that, upon execution by the one or more computing devices, cause the system at least to:
   identify a transformation of relational data of the database to a data item, the transformation selected based at least in part on data size being compatible with the distributed storage.

5. The system of claim 1, further comprising one or more memories having stored thereon computer-readable instructions that, upon execution by the one or more computing devices, cause the system at least to:
   delete the first mapping and the second mapping in response to a determination that at least the plurality of data items has been stored on the partition.

6. A computer-implemented method for migrating data from a database to a distributed storage system, the method comprising:
   identifying a partition, of a plurality of partitions of the distributed storage system, for maintaining data to be migrated from the database to the distributed storage system;
   determining, in response to a request to read a first data item, that the first data item has not been stored on the partition, based at least in part on a first mapping between a first key of the first data item and a first location, the first location indicative of the first data item being stored in the database;
   causing the request to read the first data item to be processed based at least in part on accessing the first data item in the database;
   writing, in response to a second request to write a second data item, the second data item in the partition and storing information indicative of a second mapping between a second key of the second data item and a second location, the second location indicative of the second data item being stored in the partition; and
   writing a plurality of data items to the partition, the plurality of data items read from the database, the second data item excluded from the plurality of data items based at least in part on the second mapping indicating that the second data item is located in the partition.

7. The computer-implemented method of claim 6, further comprising:
   maintaining a record indicative of a relationship between a logical partition and the partition, the record comprising information indicative of a migration state of data in the logical partition.

8. The computer-implemented method of claim 6, further comprising:
   receiving information indicative of a plurality of write operations directed to the database;
   replaying the plurality of write operations on the partition; and
   monitoring performance of the partition during replay of the plurality of write operations.

9. The computer-implemented method of claim 6, further comprising:

identifying a transformation of relational data of the database to a data item, the transformation selected based at least in part on data size being compatible with the distributed storage system.

10. The computer-implemented method of claim 6, further comprising:
deleting the first mapping and the second mapping in response to a determination that at least the plurality of data items has been stored on the partition.

11. The computer-implemented method of claim 6, wherein the first mapping and the second mapping are maintained in a temporary storage local to a client application.

12. The computer-implemented method of claim 6, further comprising:
determining, in response to an additional request to read the first data item, to retrieve the first data item from the partition without accessing the first mapping, the determining based at least in part on a migration status of data in the partition.

13. The computer-implemented method of claim 6, further comprising:
writing the first data item to the partition in response to the request to read the first data item.

14. The computer-implemented method of claim 6, further comprising:
receiving, at a migration service, metadata comprising information indicative of credentials for connecting to the database;
causing a first data in the database to be transformed to the first data item; and
causing the request to read the first data item to be redirected to the migration service.

15. A non-transitory computer-readable storage medium having stored thereon instructions that, upon execution by a computing device, cause the computing device at least to:
identify a partition, of a plurality of partitions of a distributed storage system, for maintaining data to be migrated from a database to the distributed storage system;
determine, in response to a request to read a first data item, that the first data item has not been stored on the partition, based at least in part on a first mapping between a first key of the first data item and a first location, the first location indicative of the first data item being stored in the database;
cause the request to read the first data item to be processed based at least in part on accessing the first data item, the first data item corresponding to at least a subset of a row of a table of the database;
write, in response to a second request to write a second data item, the second data item in the partition and storing information indicative of a second mapping between a second key of the second data item and a second location, the second location indicative of the second data item being stored in the partition; and
write a plurality of data items to the partition, the plurality of data items read from the database, the second data item excluded from the plurality of data items based at least in part on the second mapping indicating that the second data item is located in the partition.

16. The non-transitory computer-readable storage medium of claim 15, comprising further instructions that, upon execution by the one or more computing devices, cause the one or more computing devices to at least:
maintain a record indicative of a relationship between a logical partition and the partition, the record comprising information indicative of a migration state of data in the logical partition.

17. The non-transitory computer-readable storage medium of claim 15, comprising further instructions that, upon execution by the one or more computing devices, cause the one or more computing devices to at least:
receive information indicative of a plurality of write operations directed to the database; and
replay the plurality of write operations on the partition.

18. The non-transitory computer-readable storage medium of claim 15, comprising further instructions that, upon execution by the one or more computing devices, cause the one or more computing devices to at least:
identify a transformation of relational data of the database to a data item, the transformation selected based at least in part on data size being compatible with the distributed storage system.

19. The non-transitory computer-readable storage medium of claim 15, comprising further instructions that, upon execution by the one or more computing devices, cause the one or more computing devices to at least:
delete the first mapping and the second mapping in response to a determination that at least the plurality of data items has been stored on the partition.

20. The non-transitory computer-readable storage medium of claim 15, comprising further instructions that, upon execution by the one or more computing devices, cause the one or more computing devices to at least:
retrieve the first data item from the partition without accessing the first mapping.

21. The non-transitory computer-readable storage medium of claim 15, comprising further instructions that, upon execution by the one or more computing devices, cause the one or more computing devices to at least:
write the first data item to the partition in response to the request to read the first data item.

* * * * *